Jan. 8, 1952  M. A. MARSHALL  2,581,679
DEVICE FOR THE RELIEF OF BLOAT IN CATTLE
Filed June 19, 1950
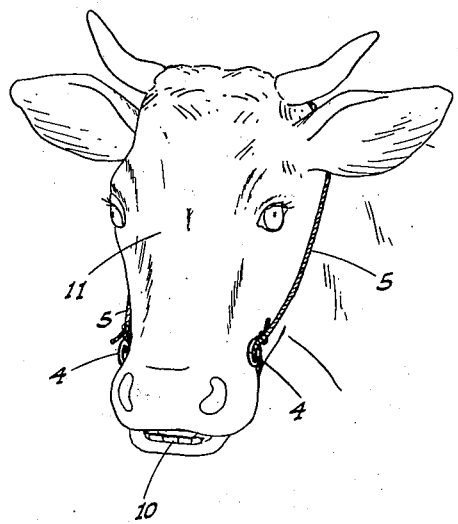
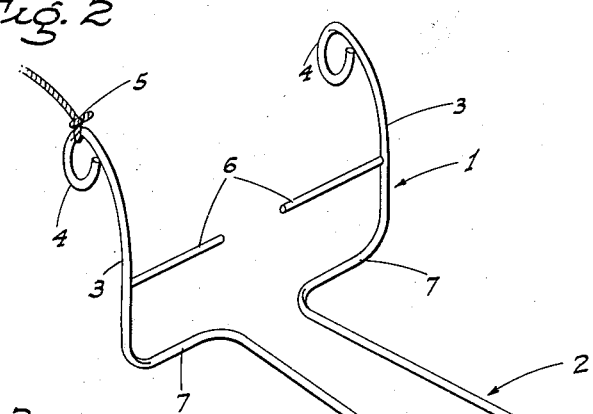
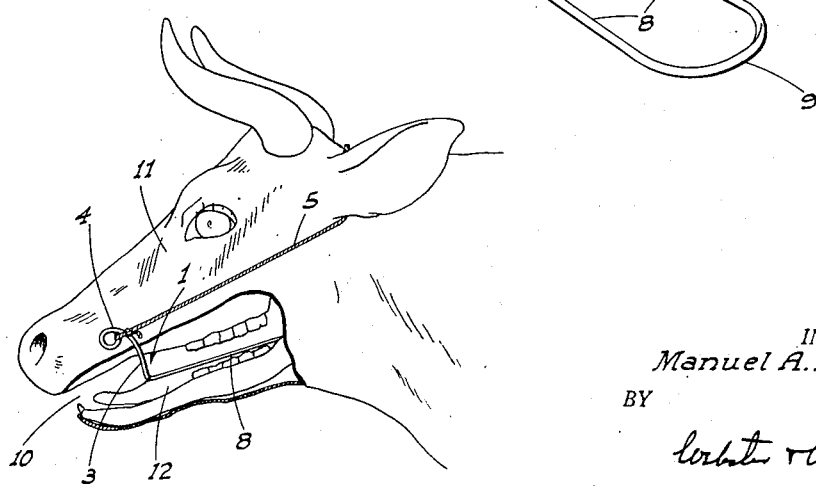
INVENTOR.
Manuel A. Marshall
BY
ATTYS Patented Jan. 8, 1952

2,581,679

UNITED STATES PATENT OFFICE 2,581,679

DEVICE FOR THE RELIEF OF BLOAT IN CATTLE

Manuel A. Marshall, Escalon, Calif.

Application June 19, 1950, Serial No. 168,943

3 Claims. (Cl. 128—14)

This invention is directed to, and it is an object to provide, a novel device for the relief of bloat in cattle.

Another object of the invention is to provide a device, for the purpose described, which is adapted to be engaged in the mouth of the afflicted animal, causing the latter to belch and vomit, thus relieving the bloat.

A further object of the invention is to provide a device, as above, which is secured in place in the animal's mouth and remains in position until the condition of bloat is fully relieved; the device fitting bit-like in the mouth, and being retained in place by a cord which extends from opposite sides of the device about the animal's head rearwardly of the horns.

An additional object is to provide a device, for relief of bloat in animals, which includes a member which depresses the animal's tongue at the rear thereof so as to cause gagging with resultant vomiting and belching.

It is also an object of the invention to provide a device, for the relief of bloat in animals, which is designed for ease and economy of manufacture; the device being light weight but sturdy, and convenient to apply to or remove from the animal.

Still another object of the invention is to provide a practical and effective device, for the relief of bloat in animals, and yet one which will be exceedingly effective for the purpose for which it is designed.

These objects are accomplished by means of such structure and relative arrangement of parts as will fully appear by a perusal of the following specification and claims.

In the drawings:

Fig. 1 is a face view of the head of an animal, with the device in place in the mouth.

Fig. 2 is an enlarged, perspective view of the device, detached.

Fig. 3 is a side view, partly broken away, of an animal's head, with the device in place in the mouth.

Referring now more particularly to the characters of reference on the drawings, the novel device, for the relief of bloat in cattle, comprises an upstanding, substantially U-shaped bit unit, indicated generally at 1, and a flat, elongated tongue depressor, indicated generally at 2, projecting rearwardly in rigid relation from the lower end of the bit unit centrally of its sides.

The bit unit 1 comprises upstanding side shanks 3 having eyes 4 on the upper ends thereof, between which eyes 4 a retention cord 5 is adapted to be connected; such shanks curving forwardly in the upper half.

Bits 6 project laterally inwardly, in alinement, from the upstanding side shanks 3 intermediate the upper and lower ends of the latter; said bits terminating in spaced-apart relation at adjacent ends.

At their lower ends the upstanding side shanks 3 are formed with inturned feet 7 which merge with relatively long fingers 8 which form the rearwardly projecting tongue depressor 2, and said fingers 8 are connected, at the inner end of the device, by an integral end loop 9.

Constructed as described, the device may be manufactured from a single length of metallic or plastic rod, with the exception of the inwardly projecting bits 6 which are initially separate pieces rigidly secured in suitable manner to the upstanding shanks 3.

The device when in use is positioned in the mouth 10 of an animal's head 11 in the manner shown in Figs. 1 and 3. To dispose the device in place it is inserted in the animal's mouth 10 with the bit unit 1 rearwardly to substantially maximum extent; i. e. with the upstanding side shanks 3 directly at the corresponding corners of the mouth, and with the eyes 4 alongside the nose exteriorly thereof.

The depressor 2 rests directly on top of the animal's tongue 12, extending rearwardly to a point with the end loop 9 resting directly on the rear end or root portion of said tongue.

The retention cord 5 extends, under considerable tension, from the eyes 4 rearwardly about the head 11 of the animal back of the ears and horns.

As the eyes 4 are some distance above and ahead of the bits 6 and the tongue depressor 2, the tension which the cord 5 exerts on the device tends to cause it to rock rearwardly about the inturned feet 7 as an axis, forcing the rear end of the tongue depressor 2 downwardly. This in turn depresses the inner end of the tongue 12 of the animal, causing the latter to gag and resulting in vomiting and belching.

This vomiting and belching provides great relief for bloat occurring in the animal, and which bloat results from feeding or pasturing on succulent alfalfa, clover, or certain other grasses.

By careful observation and application of the device to a bloated animal, relief is obtained before the danger point is reached, and without substantial loss of milk production, or death of the animal.

It is preferred that the animal be positioned with the fore feet higher than the hind feet when the device is applied, as this aids in the relief of the bloat; it being intended that the device remain in the animal's mouth for such period of time as is required to accomplish the desired end.

With use of the herein described device, relief of bloat in cattle can be obtained without the necessity of perforating the abdominal cavity with a trocar, which is an undesirable practice, and which most frequently stops milk production, and in some instances causes the death of the animal.

The device, while simple in structure and thus capable of ready and economical manufacture, is a sturdy, practical instrumentality for the purpose, and can be manipulated readily and conveniently.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are obtained:

1. A device, for the relief of bloat in cattle, comprising a bit unit, including upstanding side shanks having eyes on their upper ends for engagement with a retention cord, bits projecting laterally inwardly from the shanks intermediate the ends thereof, inturned feet on the shanks; and an elongated tongue depressor rigid with and projecting rearwardly from the feet centrally of the bit unit.

2. A device, for the relief of bloat in cattle, comprising a generally U-shaped, upstanding bit unit having eyes on the upper ends for engagement with a retention cord and bits projecting laterally inwardly from opposite sides below the eyes; and a flat elongated tongue depressor rigid with and projecting rearwardly from the lower end of the bit unit centrally of its sides.

3. A device as in claim 2, in which the side shanks curve forwardly above the bits whereby to dispose the eyes ahead and above said bits so as to enhance the leverage on the tongue depressor upon rearward tension being applied to the retention cord.

MANUEL A. MARSHALL.

REFERENCES CITED

The following references are of record in the file of this patent:

UNITED STATES PATENTS

| Number | Name | Date |
|---|---|---|
| 1,915,454 | Steigenberger | June 27, 1933 |
| 2,516,413 | Pequend | July 25, 1950 |